2,430,448

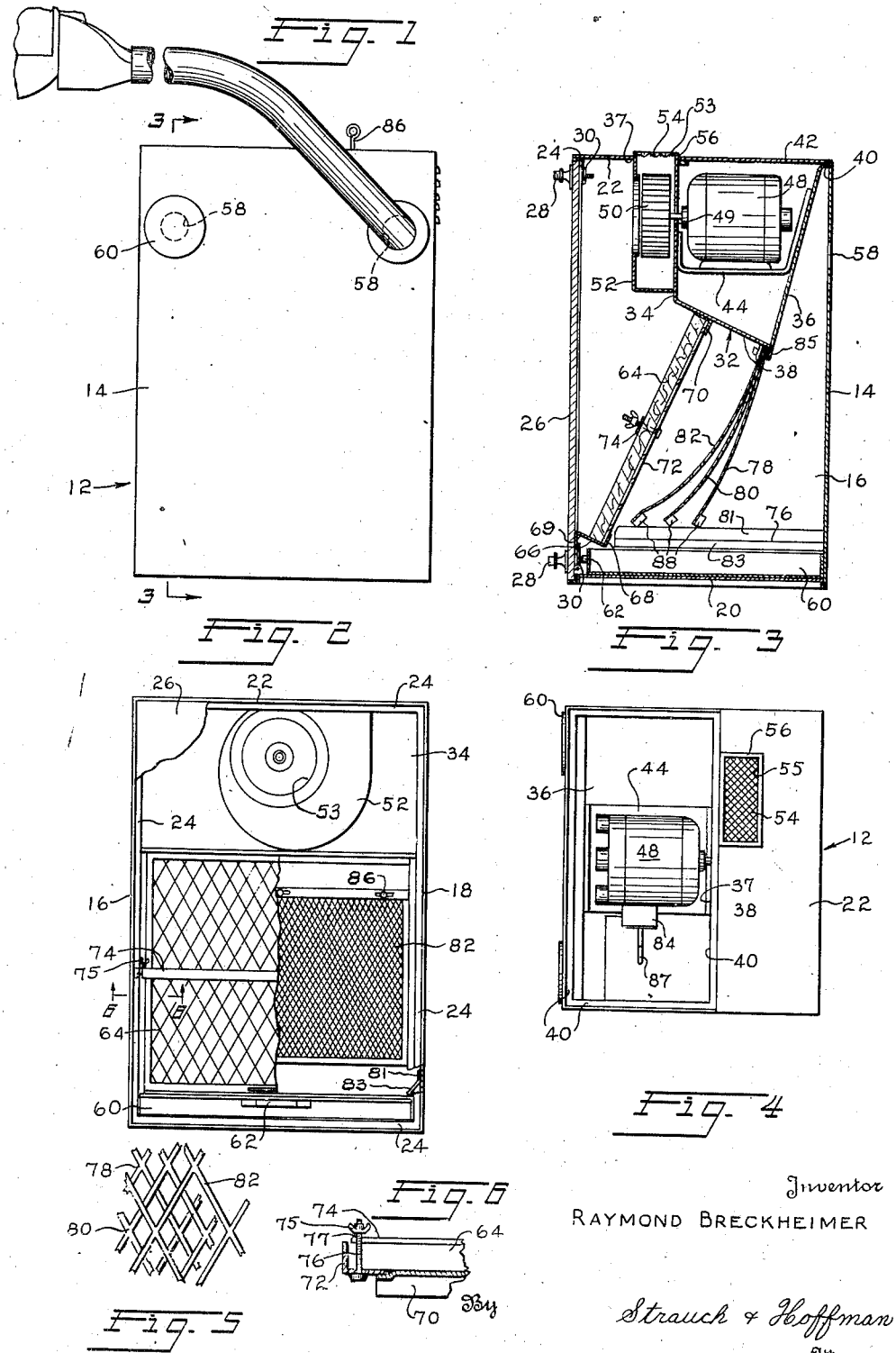
Nov. 11, 1947.   R. BRECKHEIMER   2,430,448
DUST COLLECTOR
Filed Dec. 19, 1944
Inventor
RAYMOND BRECKHEIMER
By Strauch & Hoffman
Attorneys Patented Nov. 11, 1947

UNITED STATES PATENT OFFICE 2,430,448

DUST COLLECTOR

Raymond Breckheimer, Milwaukee, Wis., assignor, by mesne assignments, to Rockwell Manufacturing Company, Pittsburgh, Pa., a corporation of Pennsylvania Application December 19, 1944, Serial No. 568,832

8 Claims. (Cl. 183—35)

1

This invention relates to means for separating solid particles from fluids and more particularly to apparatus for collecting shop, metal, wheel and like dust from an air stream.

Dust collectors and like means for separating solid particles from fluids commonly employ filter media through which the fluid is conducted. Separating means of such character are, however, open to the objections that operation must be rather frequently interrupted to clean or replace the filter media and that the fluid flow is not uniformly distributed over the area of the filter with the result that certain parts become clogged much more quickly than others and impair the efficiency of the filtering operation. Furthermore, it has been a rather common practice, in dust separating devices heretofore proposed, to employ filter media formed of cloth or other combustible material. Since sparks from abrasive wheels or the like are often drawn into the device, such means constitutes a fire hazard.

A primary object of this invention is to provide a dust collector capable of efficient operation for greatly increased periods of operating time.

Another object of the invention is to provide a dust collector having separating means wherein the flow of the solid particle carrying fluid is dispersed uniformly over the entire area of the filter means.

Still another object of the invention is to provide a dust collector equipped with means which act to deflect a substantial portion of the solid matter from the fluid stream before reaching the filter.

A further object of the invention is to provide a dust collector having dust deflecting means designed so as to effect substantially uniform distribution of the dust carrying flow over the area of the filter.

A still further object of the invention resides in providing a dust collector which is of fireproof construction throughout.

Another object of the invention is to provide a dust collector having a set of open mesh elements mounted and relatively associated so as to effectively deflect dust particles and to cause uniform distribution of the dust carrying stream.

Still another object of the invention is to provide a dust collector of generally improved design.

Other objects of the invention will appear from the following detailed description of a preferred embodiment of my invention, and are such as may be attained by a utilization of the various novel principles, combinations and subcombinations hereinafter set forth, and defined by the scope of the appended claims in the various relations to which they are applicable by persons skilled in the art.

As shown in the drawings:

Figure 1 is a front elevational view of the dust collector of the present invention having dust removal connection with an abrading machine;

Figure 2 is a rear elevational view of the dust collecting apparatus with the major portion of the rear wall removed and part of the filter unit broken away;

Figure 3 is a transverse section taken substantially on line 3—3 of Figure 1;

Figure 4 is a top plan view of the apparatus with the cover removed;

Figure 5 is an enlarged, fragmentary, elevational view looking at the rear of the set of deflecting screens; and Figure 6 is an enlarged fragmentary section on line 6—6 of Figure 2.

Referring to the drawing, wherein like reference characters designate corresponding parts in the several views, 12 generally designates the housing which, in the embodiment illustrated, is of rectangular, vertically and horizontally elongated configuration. Vertical front and end walls 14, 16 and 18, respectively, are fixedly connected with a horizontal bottom wall 20 while a horizontal top wall 22 is fixedly associated with the end walls. Within the rear margins of the top, bottom and end walls are secured inwardly directed felt covered flanges 24 defining a set-in marginal frame against which is normally fitted, in flush position, a vertical removable rear wall 26. This rear wall is releasably fastened in place by means of two conventional latch devices 28 mounted at the top and bottom thereof in co-operative relation with the housing flanges 24.

Within the upper portion of the housing 12 is mounted a substantially trough shaped compartment 32 extending longitudinally of the housing and embodying a vertical side wall 34 parallel with and spaced substantially inward of the rear wall 26 and in a plane substantially coincident with the inner edge of the top wall 22. The opposite side wall of the compartment, indicated at 36, is disposed with its top edge in close proximity to the upper edge of the front wall 14 and diverging acutely inward from the latter. The bottom wall 38 of the compartment is disposed obliquely at an acute inclination to the horizontal, having one side edge connected with the bottom edge of the rear compartment wall 34 and its opposite side edge connected to the substantially lower bottom edge of the compartment wall 36. The walls 34, 36 and 38 extend between the end walls 16 and 18 of the housing and are secured to the latter, as by welding. The top of the compartment is in registry with an opening 37 in the top of the housing, the top wall 22 extending from the rear wall 26 to the adjacent side of the compartment. Within the upper parts of the compartment defining walls are provided felt covered flanges 40 forming a horizontal marginal seat for a flush fitting removable cover 42.

On the horizontal intermediate portion of an approximately V-shaped support 44 secured in transverse position in the compartment 32, as by welding, is mounted an electric motor 48 having its shaft extended transversely through an opening 49 in the compartment wall 34. A suction fan, which may be of the squirrel cage type, is mounted at the rear of compartment 32 and, in the form shown, constitutes an impeller 50 fixed on the horizontally extending shaft of motor 48 and operates within an involute casing 52, opening through a side wall, as at 55, to receive air centrifugally and to expel it through the top opening 53 normally covered by a screen 54 held in place by a marginal frame 56. The front wall 14 of the housing is provided with a pair of horizontally spaced inlet openings 58 each of which is adapted for connection with a dust delivery tube. When only one of the inlets is in use the other is covered by a blank plate 60. As shown at Figures 1 and 3, the inlets 58 are formed in the upper portion of the front wall in a vertical location medially of the top and bottom edges of the inclined compartment wall 36, for a purpose which will be hereinafter described.

Seated horizontally in the bottom of the housing 12 is a relatively shallow pan 60 having an area approximately corresponding to that of the bottom wall 20. To the front side of the pan is connected a handle 62 enabling convenient sliding removal of the pan for emptying when the rear wall 26 is removed.

Upon a seating frame in the housing is detachably mounted filter means 64 advantageously embodying a plurality of layers of wire cloth packed between screens in a marginal frame having cleaning openings in the bottom thereof. This provides a filter unit which is fireproof and can be easily cleaned, the precise construction and the size of openings being varied to suit the particular nature of the dust to be filtered. The seating frame may embody an angle bar 66 secured in horizontally extending position in the lower front portion of the housing immediately above the level of the tray and having an upwardly directed seating lip 68 at its inner edge. Bar 66 is inclined transversely and is formed, at its outer elevated edge, with a depending flange 69 welded to the vertical end wall flanges 24. The top of this frame comprises an angle bar 70 secured to the underside of the compartment wall 38, with one of its flanges directed at a downward inclination, while the sides embody inclined angle bars 72 secured to the end walls 16 and 18, respectively. The seating faces of these frame bars are preferably covered with padding, such as felt strips. The filter unit is removably held on the felt covered frame bars by means of a bolt 76 extended through an opening in and welded to each bar 72 and having a wing nut 75 threaded thereon. A flat bar 74 disposed horizontally across the filter 64 has a transverse notch 77 adjacent each end slidably engaging the bolts 76. By tightening the wing nuts 75 against the bar 74 the filter unit can be firmly clamped upon its seating frame work to effect a tight seal continuously about the margin of the filter.

To each of the side walls 16 and 18 is secured, as by spot welding, the upper vertical part of a strip 81, extending rearwardly from the front wall 14, and having a lower part 83 bent at an inward inclination so as to deflect matter falling from above into the pan 60.

Immediately forward of the filter unit are provided deflecting and distributing means comprising a set of, in the present example three, elements 78, 80 and 82. Each of these elements may comprise an expanded metal sheet formed to provide vertically elongated openings. These sheets or screens are so related that their upper ends are in contiguous association, that is, in contacting or in closely related assembly at the bottom of the compartment and diverge downwardly at acute angles so that their bottom ends assume substantially spaced arrangement. Each of these screens as well as the filter unit is inclined so that its lower end is disposed substantially rearwardly of its top end for a purpose that will be later described.

Thus, the upper margins of the deflecting screen are secured, in overlapping assembly, against a lip 85 extended from the wall 36, as shown at 86. To the bottom margin of each of these deflecting screens is secured a reinforcing bar 88 having its ends resting on the top edges of strips 81. As illustrated at Figure 3, screens 78, 80 and 82 may advantageously be mounted to assume an arcuate curvature vertically of the housing and concavely with relation to the filter unit.

The motor 48 is equipped with conventional switch means, shown at 84, rendered conveniently operative by an extension lever 87 which may protrude through a suitable aperture in the top wall 22.

When the impeller 50 is rotated through operation of the motor 48, the dust carrying air stream is drawn into the housing through one or both of the inlet openings 58 and travels downwardly between the walls 36 and 14, the inwardly inclined compartment wall 36 serving to deflect the stream. The dust laden stream then travels substantially horizontally through a passage provided between the bottom compartment wall 38 and the bottom of the housing, passing through the respective screens 78, 80 and 82 of the deflector media and subsequently through the filter member 64 whence it travels upwardly and exhausts through the top opening covered by the screen 54. As shown at Figure 5, the apertured sheets or screens forming the deflecting media are advantageously arranged with their ribs or bridges in successively staggered relation, so that, together with the relatively close association of the deflecting elements thereat, the upper part of the deflector assembly causes maximum resistance to the stream flow. Since the formation of the compartment 32 in the housing is such as to provide a tortuous passage comprising a down flow intake passage, a horizontal tapering separating passage and an up flow outlet passage with the fan mounted at the top of the latter, maximum suction is created at the top of the separating passage with gradual decrease toward the bottom thereof. As a consequence, a relatively high speed stream of dust laden air is drawn through the tortuous passage to effect a partial separation of dust particles by the relatively abrupt changes of flow of the air stream in the tortuous passage.

The downwardly diverging relation of the deflecting screens is designed to vary the resistance to air flow therethrough in accordance with the variation in the pressure of the air stream so as to disperse the stream and to effect approximately uniform distribution of flow throughout the area of the filter unit.

The inclination of the deflecting elements and diminished flow of the air stream towards the bottom of the housing is such that a substantial part of the dust carried therein, particularly heavier and larger particles, is deflected by the screens and caused to fall into the collecting pan 60. Thus, the quantity of dust carried against the filter is materially reduced. Furthermore, the mounting of the filter member at an inclination generally in correspondence with that of the deflecting screens will cause an appreciable amount of the dust impinging thereagainst to drop therefrom into the bottom pan. In consequence thereof dust is accumulated on the filter at a much lower rate with the result that the frequency of interruption of the operation of the collector apparatus, for replacement and cleaning of the filter, is very substantially reduced.

Due to the deflection of the dust laden air stream, the downward widening of the down flow passage and the abrupt change of direction of flow into the separating passage with the consequent reduction of velocity some of the heavier foreign particles are precipitated into the collecting pan before reaching the deflecting screens. Also the inclination of the bottom wall of the compartment causes the stream to flow in an upwardly inclined direction as it passes through the inclined screens and filter unit to enhance the particle deflecting characteristics thereof. Furthermore, the inclined mounting of the filter enables use of a relatively large filtering area without unduly enlarging the size of the main housing and, when using a dry filter, permits particles to drop therefrom into the pan when the fan is not in operation.

It is to be noted that the fan is located so as to obviate wear or damage thereto by the foreign matter which is separated from the air stream before reaching the impeller and that the shaft opening 49 is made large enough to permit air to be drawn from the shielded motor containing a compartment to ventilate the same. The suction created in the up flow passage also serves to seal the back wall against its seating while enabling convenient detachment for inspection, filter cleaning and pan removal when the fan is at rest.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an apparatus for separating dust from an air stream, a chamber, a motor compartment protruding into the top of the chamber and forming a tortuous separating passage therein, a fan connected to said motor and arranged to conduct air through said passage, filter means mounted so that the air stream conducted through the passage will pass therethrough, and a plurality of apertured deflecting sheets mounted at the inlet side of the filter means so that the air stream must pass successively therethrough before reaching the filter means, said deflector sheets being arranged to offer varying degrees of resistance to the passage of air through adjacent areas of said passage and distribute the air stream substantially uniformly over the area of the filter means and deflect dust particles from the air stream to the bottom of the chamber.

2. A dust collector comprising a housing, a motor compartment within the upper part of the housing and forming a passage in the lower part thereof of expanding cross section from the inlet to the outlet, a motor driven fan for drawing a dust carrying air stream through said passage, a filter member mounted so that the air stream conducted through the passage must pass therethrough, and deflector means mounted in said passage at the inlet side of the filter adapted to deflect particles of dust carried by the air stream prior to passage of the latter through the filter.

3. The invention as defined in claim 2 wherein said motor compartment extends between opposed side walls of the housing and opens through the top of the housing, said compartment having its front wall disposed with its top edge adjacent the front wall of the housing and diverging from the latter, the opposite wall of the compartment being spaced substantially inward of the rear housing wall, said fan being located in the upper rear part of the housing for drawing dust laden air through the passage and exhausting through an outlet at the top of the housing, the front wall of the housing having an air inlet adjacent the top thereof whereby the air stream is deflected downwardly by the front compartment wall.

4. The invention as defined in claim 2 wherein the deflector means comprises a plurality of expanded metal sheets inclined in the passage to deflect dust particles from the air stream to the bottom of the housing, said sheets having their top portions in closely associated relation but with their lower portions further separated and diverging downwardly therefrom so as to effect substantially uniform distribution of the air stream over the area of the filter member, said deflector means being so arranged that all of the air must pass through them successively.

5. In a dust collector, a rectangular housing; means forming a compartment within the upper part of the housing and opening through the top of the latter, said compartment forming means comprising a vertical rear wall spaced inwardly of the rear wall of the housing, a front wall diverging downwardly with relation to the front wall of the housing, a bottom wall inclined upwardly toward the rear of the housing, said compartment walls extending between and being fixed to opposed end walls of the housing, the front wall of the housing having a plurality of air inlet openings disposed so that an air stream entering the housing therethrough is deflected downward and dispersed by the diverging front compartment wall; a motor supported in said compartment; and a fan driven by said motor adapted to create air flow in the housing about the compartment.

6. A dust collector comprising a rectangular housing having air inlet openings in the upper portion of its front wall; a motor compartment within the upper part of the housing and comprising a front wall diverging downwardly from the upper edge of said front wall past said air inlets, a bottom wall inclined upwardly and rearwardly from the bottom edge of said downwardly diverging front wall and a vertically extending rear wall extending from the rear edge of said bottom wall and spaced inwardly from the rear wall of said housing to provide a tortuous passage; a motor supported in said compartment; a fan driven by said motor disposed at the upper rear end of said tortuous passage to draw an air stream through said tortuous passage at a relatively high speed to effect a partial removal of the dust particles by the relatively abrupt changes in direction of flow through said tortuous passage; and means in said passage for dispersing said air stream to obtain an even distribution thereof; and subsequent means for filtering said air stream as it passes through said tortuous passage.

7. In apparatus for separating dust from an air stream, a chamber having a tortuous passage, including a separating passage and an angularly related intersecting passage for the dust carrying air stream, filter means mounted across said separating passage so that the air stream must pass therethrough, a fan mounted in said angularly related passage to propel the dust carrying air through said tortuous passage, a plurality of apertured air dispersing sheets mounted transversely in said separating passage so that the air stream must pass successively therethrough before reaching the filter means, said deflectors having their edges adjacent the wall defining the inside of the bend joining said separating passage and said angularly related passage in contiguous relation and diverging toward their opposite edges so as to effect approximately uniform distribution of the air flow over the area of the filter means.

8. In a dust removal system for particle laden gaseous fluids, means forming a duct of continuously expanding cross-section, said duct having a first portion extending in one direction and a second portion extending abruptly in another direction to change the direction of flow of the particle laden fluid; a filter in said second section; and dispersing means adjacent said filter and in the region wherein the direction of flow of said gases is changed, said dispersing means being so arranged that all of the gases in said duct pass therethrough before entering said filter, said dispersing means serving to distribute the flow of gases evenly to all parts of said filter after changing direction in said duct.

RAYMOND BRECKHEIMER.

REFERENCES CITED

The following references are of record in the file of this patent:

UNITED STATES PATENTS

| Number | Name | Date |
|---|---|---|
| 2,384,414 | Antrim | Sept. 4, 1945 |
| 2,062,728 | Roberts | Dec. 1, 1936 |
| 1,990,110 | Bridges | Feb. 5, 1935 |
| 1,528,439 | Leiman | Mar. 3, 1925 |
| 1,576,121 | Preble | Mar. 9, 1926 |
| 1,501,416 | Lane | July 15, 1924 |

FOREIGN PATENTS

| Number | Country | Date |
|---|---|---|
| 631,659 | France | Dec. 24, 1927 |
| 524,241 | Great Britain | Aug. 1, 1940 |
| 437,626 | Germany | Nov. 25, 1926 |